(12) United States Patent
Yoshida

(10) Patent No.: US 7,856,518 B2
(45) Date of Patent: Dec. 21, 2010

(54) INFORMATION PROCESSING DEVICE

(75) Inventor: Kenji Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 191 days.

(21) Appl. No.: 12/319,497

(22) Filed: Jan. 8, 2009

(65) Prior Publication Data
US 2009/0193161 A1 Jul. 30, 2009

(30) Foreign Application Priority Data
Jan. 8, 2008 (JP) ............................. 2008-001370

(51) Int. Cl.
G06F 13/12 (2006.01)
(52) U.S. Cl. ........................................................ 710/74
(58) Field of Classification Search .................... 710/74
See application file for complete search history.

(56) References Cited

U.S. PATENT DOCUMENTS

| 6,859,856 | B2 * | 2/2005 | Piau et al. .................. 711/103 |
| 2003/0084221 | A1 * | 5/2003 | Jones et al. ................. 710/302 |
| 2005/0182881 | A1 * | 8/2005 | Chou et al. ................. 710/301 |

FOREIGN PATENT DOCUMENTS

| JP | 2004-355476 | 12/2004 |
| JP | 2007-172047 | 7/2007 |
| JP | 2007-172511 | 7/2007 |
| JP | 2007-183879 | 7/2007 |
| JP | 2007-241523 | 9/2007 |
| JP | 2008-107876 | 5/2008 |

* cited by examiner

*Primary Examiner*—Henry W Tsai
*Assistant Examiner*—Juanito C Borromeo
(74) *Attorney, Agent, or Firm*—Nutter McClennen & Fish LLP; John J. Penny, Jr.

(57) ABSTRACT

An information processing device comprising a data record medium access unit into which a data record medium, which has a first operation mode and a second operation mode as operation modes and has a first sub-operation mode and a second sub-operation mode as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode and a selection unit which allows a user to select a type of access to the data record medium inserted into the data record medium access unit, wherein the information processing device is able to select an operation mode having a fastest data transmission rate among operation modes in which a newly detected data record medium is operable on the basis of a mode selection table.

8 Claims, 6 Drawing Sheets

CYCLE TIME IN MEMORY MODE

| CYCLE TIME |
|---|
| 250 ns |
| (150 ns) |
| 120 ns |
| 100 ns |
| 80 ns |

FIG. 6

CYCLE TIME IN PIO MODE OF True IDE MODE

| PIO MODE | CYCLE TIME |
|---|---|
| PIO MODE 0 | 600 ns |
| PIO MODE 1 | 383 ns |
| PIO MODE 2 | 240 ns |
| PIO MODE 3 | 180 ns |
| PIO MODE 4 | 120 ns |
| PIO MODE 5 | 100 ns |
| PIO MODE 6 | 80 ns |

FIG. 7

CYCLE TIME IN Ultra DMA MODE OF True IDE MODE

| Ultra DMA MODE | CYCLE TIME |
|---|---|
| MODE 0 | 112 ns |
| MODE 1 | 73 ns |
| MODE 2 | 54 ns |
| MODE 3 | 39 ns |
| MODE 4 | 25 ns |
| MODE 5 | 16.8 ns |
| MODE 6 | 13 ns |

FIG. 8

| MEMORY MODE | PIO MODE 0 | PIO MODE 1 | PIO MODE 2 | PIO MODE 3 | PIO MODE 4 | PIO MODE 5 | PIO MODE 6 | UDMA MODE 0 | UDMA MODE 1 | UDMA MODE 2 | UDMA MODE 3 | UDMA MODE 4 | UDMA MODE 5 | UDMA MODE 6 |
|---|---|---|---|---|---|---|---|---|---|---|---|---|---|---|
| 250 ns | MEMORY | MEMORY | PIO | PIO | PIO | PIO | PIO | PIO | UDMA | UDMA | UDMA | UDMA | UDMA | UDMA |
| 150 ns | MEMORY | MEMORY | MEMORY | MEMORY | PIO | PIO | PIO | PIO | UDMA | UDMA | UDMA | UDMA | UDMA | UDMA |
| 120 ns | MEMORY | MEMORY | MEMORY | MEMORY | PIO | PIO | PIO | PIO | UDMA | UDMA | UDMA | UDMA | UDMA | UDMA |
| 100 ns | MEMORY | MEMORY | MEMORY | MEMORY | MEMORY | PIO | PIO | PIO | UDMA | UDMA | UDMA | UDMA | UDMA | UDMA |
| 80 ns | MEMORY | MEMORY | MEMORY | MEMORY | MEMORY | MEMORY | PIO | PIO | UDMA | UDMA | UDMA | UDMA | UDMA | UDMA |

TB10

MEMORY: MEMORY MODE
PIO: PIO MODE
UDMA: Ultra DMA MODE

INFORMATION PROCESSING DEVICE

Priority is claimed under 35 U.S.C. §119 to Japanese Patent Application No. 2008-001370 filed on Jan. 8, 2008, which is hereby incorporated by reference in its entirety.

BACKGROUND

1. Technical Field

The present invention relates to an information processing device and particularly to an information processing device capable of selecting an appropriate communication rate used to exchange data with a data record medium.

2. Related Art

An example of a data record medium on which an information processing device such as a personal computer records data includes a CF (Compact Flash (registered trademark)) card. The information processing device compatible with this CF card is provided with a card slot for the CF card. When a user inserts the CF card into the card slot, the information processing device is able to gain access to the CF card.

The CF card is classified into two types, a memory card and an I/O card. When the information processing device exchanges data with the CF card of the memory card type which is inserted into the card slot, one of two operation modes, a memory mode or a True IDE mode, is used.

The information processing device is able to exchange data with the CF card in either the memory mode or the True IDE mode. However, because a method of gaining access to the CF card in the True IDE mode realizes a high communication rate, the information processing device checks the operation mode of the inserted CF card. In addition, the information processing device gains access to the CF card operable in the True IDE mode in a PIO mode of the True IDE mode or gains access to the CF card not operable in the True IDE mode in the memory mode (for example, see JP-A-2004-355476).

However, in some CF cards, a communication rate corresponding to the memory mode is faster than a communication rate corresponding to the PIO mode of the True IDE mode. In this case, the time necessary for data transmission can be reduced, when the memory mode is used. Therefore, in JP-A-2007-183879, the communication rate corresponding to the memory mode and the communication rate corresponding to the PIO mode of the True IDE mode are checked to select the operation mode in which a faster communication rate is realizable and gain access to the CF card.

However, it was known that even when the information processing device gains access to the CF card at a communication rate in which normal data exchange is possible, a communication error occurs and thus data are not able to be normally exchanged in some cases. It was known that the communication error occurs, because there are various kinds of CF cards manufactured by various makers, a communication rate which is designed to be compatible in accordance with the maker or the kinds of CF cards is not compatible, or there is a mismatch with a driver. In these cases, the CF card is not able to be used and thus this problem causes inconvenience to the user.

In order to solve this problem, JP-A-2007-241523 discloses an information processing device in which the communication rate is decreased to realize data exchange with the data record medium, when the data exchange even at the originally compatible highest communication rate fails and in which waiting time of a user is as short as possible by determining whether to switch the operation mode between the memory mode and the PIO mode of the True IDE mode depending on a type of access to the data recode medium.

However, recent CF cards are used in an Ultra DMA mode as well as the PIO mode in the True IDE mode. Therefore, in this case, it is necessary to select the operation mode among three modes, that is, the memory mode, the PIO mode, and the Ultra DMA mode.

Moreover, when the operation mode is switched between the memory mode as a first operation mode and the True IDE mode as a second operation mode, power supply to the CF card has to be stopped for some time. However, when the operation mode is switched between sub-operation modes of the True IDE mode, that is, the PIO mode as a first sub-operation mode and the Ultra DMA mode as a second sub-operation mode, the power supply to the CF card does not need to be stopped.

Accordingly, even when the access to the data record medium fails, it is necessary to again select an appropriate operation mode to be used to gain access to the data record medium depending on the type of access to the data record medium and a present operation mode, that is, the memory mode as the first operation mode, the PIO mode as the first sub-operation mode, or the Ultra DMA mode as the second sub-operation mode. The invention is not limited to the CF card, but may be applied to other data record media in the same manner.

SUMMARY

An advantage of some aspects of at least one embodiment of the invention is that it provides an information processing device capable of selecting an appropriate operation mode among three modes, that is, a first operation mode, a first sub-operation mode of a second operation mode, and a second sub-operation mode of the second operation mode, when gaining access to a data record medium.

According to an aspect of at least one embodiment of the invention, there is provided an information processing device including: a data record medium access unit into which a data record medium, which has a first operation mode having one or a plurality of communication rates and a second operation mode having one or a plurality of communication rates as operation modes and has a first sub-operation mode having one or a plurality of communication rates and a second sub-operation mode having one or a plurality of communication rates as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode; a selection unit which allows a user to select a type of access to the data record medium inserted into the data record medium access unit; a first access unit which gains the type of access to the data record medium which is selected through the selection unit in an operation mode in which the communication rate is the fastest among the first operation mode, the first sub-operation mode of the second operation mode, and the second sub-operation mode of the second operation mode; a second access unit which again gains the type of access to the data record medium which is selected through the selection unit, when the access of the first access unit fails, by selecting the fastest communication rate among communication rates at which normal data exchange is possible in the first operation mode and the second operation mode in a case where the access selected by the user through the selection unit is a type of access in which data are all exchanged; and a third access unit which again gains the type of access to the data record medium which is selected through the selection unit, when the access of the first access unit fails, by dropping the communication rate without performing the switching between the first operation mode and the second operation mode in a case where the access selected by the user through the selection unit is not the type of access in which data are all exchanged.

In the information processing device according to this aspect of the invention, the communication rate may be dropped to the slowest communication rate among the communication rates at which the normal data exchange with the data record medium is possible without performing the switching between the first operation mode and the second operation mode, when the third access unit drops the communication rate.

In the information processing device according to the aspect of the invention, when the access to the data record medium again fails, the second access unit may determine that the normal data exchange with the data record medium is not possible with the selected communication rate and excludes the selected communication rate from candidates of the communication rate, and then the second access unit may select the fastest communication rate among the communication rates in which the normal data exchange is possible in the first operation mode, the first sub-operation mode of the second operation mode, and the second sub-operation mode of the second operation mode to again gain the type of access to the data record medium which is selected through the selection unit.

In the information processing device according to the aspect of the invention, the type of access selected by the user through the selection unit may include at least backup of data recorded in the data record medium as the type of access in which data are all exchanged and lookup of the data recorded in the data record medium as a type of access which is not the type of access in which data are all exchanged.

In the information processing device according to the aspect of the invention, the first access unit gains access to the data record medium to acquire a communication rate at which the access to the data record medium is possible in the first operation mode, a communication rate at which the access to the data record medium is possible in the first sub-operation mode of the second operation mode, and a communication rate at which the access to the data record medium is possible in the second sub-operation mode of the second operation mode and selects the operation mode having the fastest communication rate among the acquired communication rates.

In the information processing device according to the aspect of the invention, the first operation mode may be a memory mode, the second operation mode may be a True IDE mode, the first sub-operation mode may be a PIO mode, and the second sub-operation mode may be an Ultra DMA mode.

According to another aspect of at least one embodiment of the invention, there is provided a method of controlling an information processing device including a data record medium access unit into which a data record medium, which has a first operation mode having one or a plurality of communication rates and a second operation mode having one or a plurality of communication rates as operation modes and has a first sub-operation mode having one or a plurality of communication rates and a second sub-operation mode having one or a plurality of communication rates as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode. The method includes the steps of: allowing a user to select a type of access to the data record medium inserted into the data record medium access unit; gaining the type of access to the data record medium which is selected by the user in an operation mode in which the communication rate is the fastest among the first operation mode, the first sub-operation mode of the second operation mode, and the second sub-operation mode of the second operation mode; again gaining the type of access to the data record medium which is selected by the user, when the access to the data record medium fails, by selecting the fastest communication rate among communication rates at which normal data exchange is possible in the first operation mode and the second operation mode in a case where the access selected by the user is a type of access in which data are all exchanged; and again gaining the type of access to the data record medium which is selected by the user, when the access to the data record medium fails, by dropping the communication rate without performing the switching between the first operation mode and the second operation mode in a case where the access selected by the user is not the type of access in which data are all exchanged.

According to still another aspect of at least one embodiment of the invention, there is provided a program controlling an information processing device including a data record medium access unit into which a data record medium, which has a first operation mode having one or a plurality of communication rates and a second operation mode having one or a plurality of communication rates as operation modes and has a first sub-operation mode having one or a plurality of communication rates and a second sub-operation mode having one or a plurality of communication rates as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode. The program causes the information processing device to execute the steps of: allowing a user to select a type of access to the data record medium inserted into the data record medium access unit; gaining the type of access to the data record medium which is selected by the user in an operation mode in which the communication rate is the fastest among the first operation mode, the first sub-operation mode of the second operation mode, and the second sub-operation mode of the second operation mode; again gaining the type of access to the data record medium which is selected by the user, when the access to the data record medium fails, by selecting the fastest communication rate among communication rates at which normal data exchange is possible in the first operation mode and the second operation mode in a case where the access selected by the user is a type of access in which data are all exchanged; and again gaining the type of access to the data record medium which is selected by the user, when the access to the data record medium fails, by dropping the communication rate without performing the switching between the first operation mode and the second operation mode in a case where the access selected by the user is not the type of access in which data are all exchanged.

BRIEF DESCRIPTION OF THE DRAWINGS

The invention will be described with reference to the accompanying drawings, wherein like numbers reference like elements.

FIG. 6 is a diagram illustrating a list of cycle time corresponding to a PIO mode of a True IDE mode.

FIG. 7 is a diagram illustrating a list of cycle time corresponding to an Ultra DMA mode of the True IDE mode.

FIG. 8 is a diagram illustrating an example of a mode selection table for determining which operation mode is the fastest among communication rates in the memory mode and communication rates in the PIO mode and the Ultra DMA mode of the True IDE mode.

DESCRIPTION OF EXEMPLARY EMBODIMENTS

Hereinafter, an embodiment of the invention will be described with reference to the drawings. The embodiment described below does not limit the technical scope of the invention.

Figure 1:
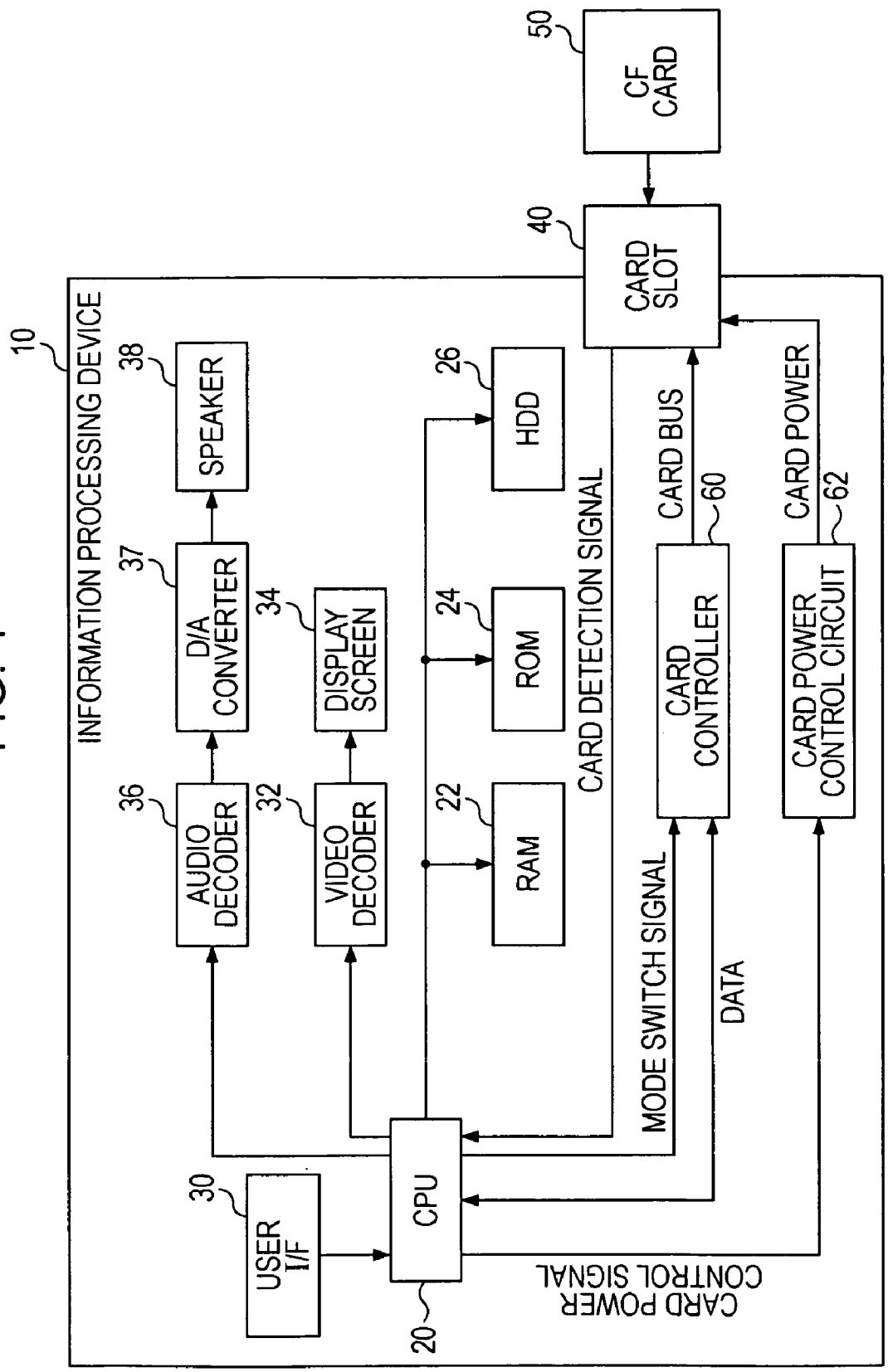
FIG. 1 is a block diagram illustrating the inner configuration of an information processing device according to an embodiment of the invention.

FIG. 1 is a block diagram illustrating an example of the inner configuration of an information processing device 10 according to the embodiment. The information processing device 10 includes various information processing devices having a card slot. In this embodiment, a small size image display device called a photo viewer or a portable music playback device is assumed as the image processing device. Of course, the information processing device is not limited to the image display device or the music playback device, but may be a personal computer such as a laptop computer or a desktop computer.

As shown in FIG. 1, the information processing device 10 according to this embodiment includes a CPU (Central Processing Unit) 20, a RAM (Random Access Memory) 22, a ROM (Read-Only Memory) 24, a hard disk drive 26, a user interface 30, a video decoder 32, a display screen 34, an audio decoder 36, a D/A converter 37, and a speaker 38.

The CPU 20, the RAM 22, the ROM 24, and the hard disk drive 26 are connected to each other through an internal bus. Therefore, the CPU 20 is able to randomly gain access to the RAM 22, the ROM 24, and the hard disk drive 26 through the internal bus.

Image data are output from the CPU 20 to the video decoder 32. The image data are decoded in the video decoder 32 to be displayed on the display screen 34. The display screen 34 is configured as an LCD (Liquid Crystal Display), a CRT (Cathode Ray Tube), or the like. In addition, music data are output from the CPU 20 to the audio decoder 36. The music data are decoded in the audio decoder 36 and subjected to digital-analog conversion in the D/A converter 37 to be output through the speaker 38.

Various user manipulation instructions are input from the user interface 30 to the CPU 20. The user interface 30 is configured as one or a plurality of buttons, a keyboard, a pointing device, or the like and may be configured by combination thereof. In the example of FIG. 1, the user interface 30 is provided in the information processing device 10, but the user interface 30 may be provided outside the information processing device 10. The CPU 20 executes various processes on the basis of the manipulation instruction from the user interface 30.

The information processing device 10 according to this embodiment is provided with a card slot 40. In this embodiment, a CF card 50 can be inserted into the card slot 40 by a user. In addition, the inserted CF card 50 can be removed. Therefore, various kinds of CF cards 50 are inserted into and removed from the card slot 40 by the user. In addition, the CF card 50 corresponding to various modes is inserted and removed. The CF card 50 is an example of a card-type record medium according to this embodiment.

In particular, this embodiment assumes that the CF card 50 inserted into and removed from the card slot 40 is a memory card which is operable in both modes, that is, a memory mode and a True IDE mode. In addition, it is assumed that the CF card 50 which is operable in both modes of the True IDE mode, that is, a PIO mode and an Ultra DMA mode is inserted into the card slot 40, and that the CF card 50 which is operable in the PIO mode but not operable in the Ultra DMA mode is inserted into the card slot 40. The memory mode corresponds to a first operation mode according to this embodiment and the True IDE mode corresponds to a second operation mode according to this embodiment. In addition, the PIO mode corresponds to a first sub-operation mode according to this embodiment and the Ultra DMA mode corresponds to a second sub-operation mode according to this embodiment.

In this embodiment, when an I/O card which is operable in an I/O mode is inserted into the card slot 40, it is assumed that an error occurs. Of course, when a new standard is established, the CF card 50 of the new standard may be inserted into and removed from the information processing device 10.

The CF card 50 inserted into the card slot 40 is controlled by the CPU 20 through a card controller 60. That is, the CPU 20 determines whether the CF card 50 is inserted into the card slot 40 on the basis of a card detection signal output from the card slot 40. When the CF card 50 is inserted, the CPU 20 outputs a mode switch signal to the card controller 60 and switches between the memory mode and the True IDE mode to gain access to the CF card. In addition, when the information processing device 10 supports the I/O mode, the mode switch signal causes a switch to the I/O mode.

A card bus is connected between the card controller 60 and the card slot 40. Data exchange is performed between the CPU 20 and the CF card 50 inserted into the card slot 40 through the card controller 60.

Card power is supplied from a card power control circuit 62 to the CF card 50 inserted into the card slot 40 through a power wire. Whether the card power control circuit 62 supplies the card power is controlled on the basis of a card power control signal output by the CPU 20. That is, when the CPU 20 detects that the CF card 50 is inserted or when the CPU 20 gains access to the CF card 50, the CPU 20 outputs a card power control signal indicating the supply of the card power to the card power control circuit 62. On the contrary, when the CPU 20 detects that the CF card 50 is removed or when the CPU 20 disconnects access to the CF card 50, the CPU 20 outputs a card power control signal indicating interruption of the supply of the card power to the card power control circuit 62.

In this embodiment, when the CF card 50 is switched from the memory mode to the True IDE mode or when the CF card 50 is conversely switched from the True IDE mode to the memory mode, it is necessary to turn off the power of the CF card 50. Therefore, even when the CPU 20 outputs the card power control signal indicating the supply of the card power, the CPU 20 outputs the card power control signal indicating interruption of supply of the card power one time. After a predetermined period of time is elapsed and the card power is sufficiently lowered, the CPU 20 outputs the card power control signal indicating the supply of the card power.

In this embodiment, when the card power control signal indicates the supply of the card power, the card power control signal is in a high level and when the card power control signal indicates the interruption of the supply of the card power, the card power control signal is in a low level, for example. In addition, whether the card power is turned on under a certain condition and whether the card power is turned off under a certain condition is set depending on the specification of the information processing device 10 or the CF card 50.

Next, a card data transmitting process which is normally performed by the information processing device 10 will be described with reference to FIGS. 2 and 3. The card data transmitting process is a process which is performed by allowing the CPU 20 to read and execute a program for the card data transmitting process which is stored in the ROM 24 or the hard disk drive 26. In addition, the card data transmitting process is a process which is automatically activated upon turning on the power of the information processing device 10.

Figure 2:
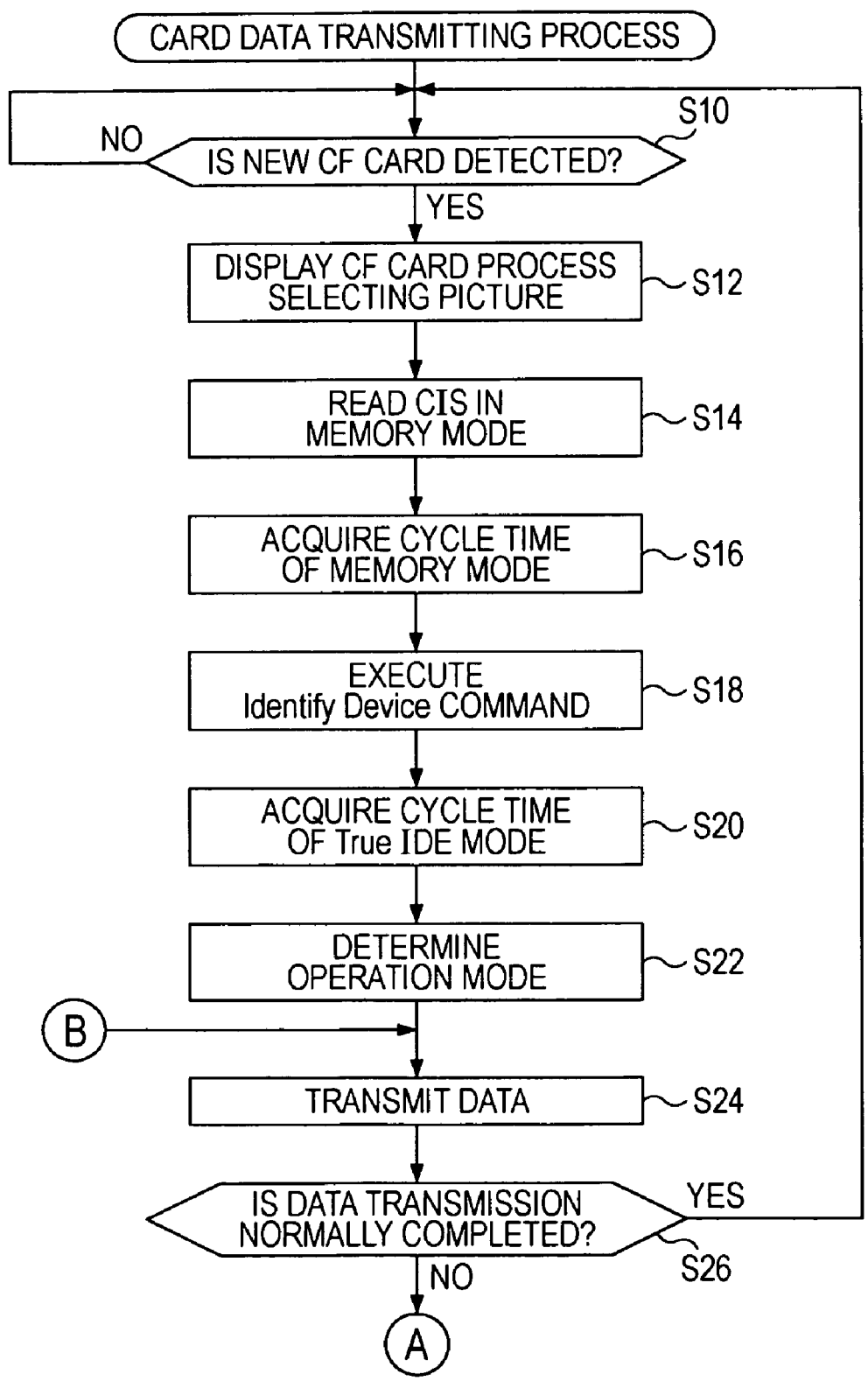
FIG. 2 is a flowchart illustrating an example of a card data transmitting process performed by the information processing device shown in FIG. 1.

As shown in FIG. 2, the information processing device 10 determines whether a new CF card 50 is detected in the card slot 40 (Step S10). In this embodiment, based on the card detection signal output from the above-described card slot 40, it is determined whether the new CF card 50 is inserted into the card slot 40.

More specifically, the information processing device 10 determines that the new CF card 50 is inserted into the card slot 40, when both signals, that is, a CD1 signal and a CD2 signal in the card slot 40 are changed from a high level to a low level. In this embodiment, the information processing device 10 checks the CD1 signal and the CD2 signal in the card slot 40 when the power of the information processing device 10 is turned on. In addition, the information processing device 10 determines that the new CF card 50 is inserted into the card slot 40, since the CF card 50 is already inserted into the card slot 40 even when the CD1 signal and the CD2 signal are in the low level upon turning on the power. That is, in this embodiment, while the CF card 50 is inserted, the CD1 signal and the CD2 signal become the low level. In addition, when the CF card 50 is not inserted, the CD1 signal and the CD2 signal become the high level. Therefore, the CD1 signal and the CD2 signal are used as the card detection signal.

When it is determined that the new CF card 50 is not detected in Step S10 (No in Step S10), Step S10 is repeatedly performed and it is waited until the new CF card 50 is detected in the card slot 40.

Figures 4, 5:
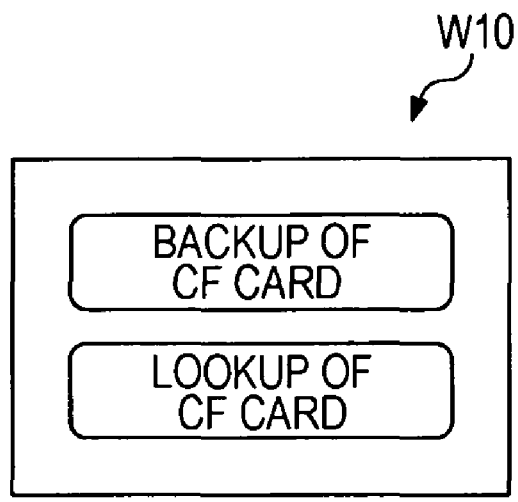
FIG. 4 is a diagram illustrating an example of a CF card process selecting picture displayed on a display screen of the information processing device.
FIG. 5 is a diagram illustrating a list of cycle time corresponding to a memory mode.

Alternatively, when it is determined that the new CF card 50 is detected in the card slot 40 in Step S10 (Yes in Step S10), the information processing device 10 displays a CF card process selecting picture W10 shown in FIG. 4 on the display screen 34 (Step S12).

As shown in FIG. 4, the CF card process selecting picture W10 according to this embodiment contains two options, that is, "backup of the CF card" and "lookup of the CF card". When "the backup of the CF card" is selected, data stored in the CF card 50 are all transmitted and backed up on the hard disk drive 26.

Alternatively, when "the lookup of the CF card" is selected, the data are not backed up, but information in the data stored in the CF card 50 is read to display a file list on the display screen 34. Then, the user selects a file regarding to still image data, a file regarding to moving image data, or a file regarding to music data to display desired files. In this embodiment, for example, when the file regarding to the still image data is selected, the selected still image data stored in the CF card 50 are read sequentially and displayed on the display screen 34. Alternatively, when the file regarding to the moving image data is selected, the selected moving image data stored in the CF card 50 are read and displayed on the display screen 34. Alternatively, when the file regarding to the music data is selected, the selected music data stored in the CF card 50 are read and reproduced through the speaker 38. Of course, in order to display a file list, it is necessary to gain access to the CF card 50 once.

The user is able to select one of "the backup of the CF card" and "the lookup of the CF card" or select a data file from the file list by manipulating the user interface 30.

When the user selects one of "the backup of the CF card" and "the lookup of the CF card", the information processing device 10 gains access to the CF card 50 in the memory mode to read and acquire CIS information, which is card attribute information (Step S14).

Next, the information processing device 10 inspects and acquires cycle time of the inserted CF card 50 in the memory mode on the basis of the read CIS information (Step S16).

FIG. 5 is a diagram illustrating a list of the cycle time at which the CF card 50 is operable in the memory mode. A table shown in FIG. 5 is stored in advance in the ROM 24 or the hard disk drive 26, for example.

As shown in FIG. 5, in this embodiment, the CF card 50 operates at one cycle time of 250 ns, 150 ns, 120 ns, 100 ns, and 80 ns. By checking bit 2 to bit 0 of a device ID in byte 2 within a CISTPL_DEVICE tuple of the CIS information, it is possible to determine at which cycle time the CF card 50 is operable. Accordingly, in Step S16, it is specified at which cycle time the inserted CF card 50 operates on the basis of the read CIS information. Here, the cycle time is time corresponding to one cycle of a basic operation clock. Therefore, it is meant that a basic operation is faster, as the cycle is shorter.

Cycle time of 150 ns is not supported by the standard of CF+ and Compact Flash Specification Revision 4.0, but some general CF cards 50 or a micro-drive having a hard disk drive therein are configured to operate at a cycle time of 150 ns. For this reason, the information processing device 10 according to this embodiment is configured to support the CF card 50 or the micro-drive which is operable at the cycle time of 150 ns.

Next, as shown in FIG. 2, the information processing device 10 performs an IDENTIFY DEVICE command (Step S18) and acquires the cycle time of the True IDE mode (Step S20). That is, even in the True IDE mode, a compatible mode varies depending on a type of the CF card 50 and thus a communication rate, that is, the cycle time varies depending on the compatible mode. Therefore, the information processing device 10 needs to inspect the compatible mode.

In general, the operation mode of the True IDE mode is broadly classified into three categories, that is, the PIO mode, a Multiword DMA mode, and the Ultra DMA mode. Several modes are prepared for each of the three operations modes according to corresponding rates. As described above, it is assumed that the two modes of the PIO mode and the Ultra DMA mode among the three operation modes are used for the information processing device 10 according to this embodiment.

Moreover, it is assumed that the information processing device 10 according to this embodiment conforms to Revision 4.0 (CF+ and Compact Flash Specification Revision 4.0), which is the latest revision, among the PIO modes. Since the PIO mode of Revision 4.0 defines PIO mode 0 to PIO mode 6, it is determined in which PIO mode the inserted CF card 50 is operable. In addition, since the Ultra DMA mode defines Ultra DMA mode 0 to Ultra DMA mode 6, it is determined in which mode the inserted CF card 50 is operable. However, in the Ultra DMA mode, it is necessary for the information processing device 10 to determine whether the CF card 50 is originally operable in the Ultra DMA mode, since some CF cards 50 are not operable in the Ultra DMA mode.

FIG. 6 is a diagram illustrating a list of cycle time in PIO mode 0 to PIO mode 6 defined in the PIO mode of the True IDE mode. A table shown in FIG. 6 is stored in advance in the ROM 24 or the hard disk drive 26, for example.

As shown in FIG. 6, the communication rate is the slowest and the cycle time is 600 ns in the PIO mode 0 of the PIO mode. The communicate rate increases as the mode number increases toward the PIO mode 6. The cycle time of the PIO mode 6 is 80 ns. The information processing device 10 determines in which mode the CF card 50 is operable on the basis of read Identify Device information, and specifies the shortest cycle time corresponding to the PIO mode.

Specifically, the information processing device 10 determines whether bit 1 of Word 53 in the Identify Device information read by executing the IDENTIFY DEVICE command is "0" or not. When bit 1 of Word 53 is "0", the PIO mode is determined on the basis of a value of Word 51. That is, when the value of Word 51 is "0", it is determined that the PIO mode corresponds to the PIO mode 0. When the value is "1", it is determined that the PIO mode corresponds to the PIO mode 1. When the value is "2", it is determined that the PIO mode corresponds to the PIO mode 2. When the value is "3", it is determined that the PIO mode corresponds to the PIO mode 3. When the value is "4", it is determined that the PIO mode corresponds to the PIO mode 4. In addition, when the value of Word 51 is "5" or more, it is determined that the card is not applicable.

Alternatively, when bit 1 of Word 53 is not "0", bit 1 of Word 64 in the Identify Device information is checked. When bit 1 of Word 64 is "1", it is determined that the PIO mode corresponds to the PIO mode 4. Alternatively, when bit 1 of Word 64 is not "1" and bit 0 of Word 64 is "1", the PIO mode corresponds to the PIO mode 3.

In this case, when bit 1 of Word 53 is not "0", Word 163 is checked. When bit 0 of Word 163 is "1", it is determined that the PIO mode corresponds to the PIO mode 5. When bit 1 of Word 163 is "1", it is determined that the PIO mode corresponds to the PIO mode 6. On the other hand, when bit 0 to bit 2 of Word 163 are "0", it is determined that the PIO mode corresponds to the PIO mode 3 or the PIO mode 4 determined on the basis of Word 64.

When bit 1 of Word 64 is not "1" and bit 0 of Word 64 is not "1", it is determined that the card is not applicable. In this embodiment, according to the above determination method, the operation mode corresponding to the PIO mode of the True IDE mode is determined and the cycle time of the True IDE mode is acquired.

FIG. 7 is a diagram illustrating a list of cycle time in mode 0 to mode 6 defined in the Ultra DMA mode of the True IDE mode. A table shown in FIG. 7 is stored in advance in the ROM 24 or the hard disk drive 26, for example.

As shown in FIG. 7, the communication rate is the slowest and the cycle time is 112 ns in the Ultra DMA mode 0 of the Ultra DMA modes. The communication rate increases as the mode number increases toward the Ultra DMA mode 6. The cycle time of the Ultra DMA mode 6 is 13 ns. The information processing device 10 determines in which Ultra DMA mode the CF card 50 is operable on the basis of read Identify Device information, and specifies the shortest cycle time corresponding to the Ultra DMA mode.

Specifically, in this embodiment, values of seven bits of bit 6 to bit 0 of Word 88 are checked in the Identify Device information of the CF card 50 which is read by executing the IDENTIFY DEVICE command. Then, it is determined whether the CF card 50 is operable in the Ultra DMA mode, and it is determined in which Ultra DMA mode the CF card 50 is operable, when the CF card 50 is operable in the Ultra DMA mode.

The information processing device 10 determines that the CF card 50 is not operable in the Ultra DMA mode when the seven bits of bit 6 to bit 0 of Word 88 are all "0." Alternatively, the information processing device 10 determines that the CF card 50 is operable in the Ultra DMA mode 6 when bit 6 is "1." The information processing device 10 determines that the CF card 50 is operable in the Ultra DMA mode 5 when bit 5 is "1." The information processing device 10 determines that the CF card 50 is operable in the Ultra DMA mode 4 when bit 4 is "1." The information processing device 10 determines that the CF card 50 is operable in the Ultra DMA mode 3 when bit 3 is "1." The information processing device 10 determines that the CF card 50 is operable in the Ultra DMA mode 2 when bit 2 is "1." The information processing device 10 determines that the CF card 50 is operable in the Ultra DMA mode 1 when bit 1 is "1."

Next, as shown in FIG. 2, the information processing device 10 determines that the operation mode is to be used for data transmission with reference to a mode selection table TB10 (Step S22). FIG. 8 is a diagram illustrating a configuration example of the mode selection table TB10 according to this embodiment. In this embodiment, the mode selection table TB10 is stored in advance in the ROM 24 or the hard disk drive 26.

As shown in FIG. 8, the mode selection table TB10 is a list that compares the cycle time in the memory mode to the operation mode of the PIO mode and the Ultra DMA mode in the True IDE mode to show which mode is faster in the communication rate between the memory mode and the True IDE mode. Accordingly, the information processing device 10 is able to select the operation mode having the actually fastest data transmission rate among the operation modes in which the newly detected CF card 50 is operable on the basis of the mode selection table TB10.

For example, when the CF card 50 is operable at the cycle time of 250 ns in the memory mode, operable at the PIO mode 1 of 283 ns in the True IDE mode, and not operable in the Ultra DMA mode, the information processing device 10 selects the memory mode as the operation mode in which the information processing device 10 is able to exchange data with the CF card 50.

For example, when the CF card 50 is operable at the cycle time of 250 ns in the memory mode, operable in the PIO mode 3 of 180 ns in the True IDE mode, and not operable in the Ultra DMA mode, the information processing device 10 selects the PIO mode 3 of the True IDE mode as the operation mode in which the information processing device 10 is able to exchange data with the CF card 50.

For example, when the CF card 50 is operable at the cycle time of 250 ns in the memory mode and operable in the Ultra DMA mode 3 of 39 ns in the True IDE mode, the information processing device 10 selects the Ultra DMA mode 3 of the True IDE mode as the operation mode.

However, the memory mode is an operation mode that is different from the True IDE mode. Therefore, when the transmission rates of the memory mode and the True IDE mode are compared to each other, a mode having the shorter cycle time is not necessarily faster in the transmission rate since drivers or data transmission protocols of the memory mode and the True IDE mode are different from each other. Therefore, in this embodiment, the operation mode is not simply determined on the basis of the cycle time. Instead, actual data transmission rates in the memory mode and the True IDE mode are examined in advance, and the mode selection table TB10 is prepared so that the operation mode having the fastest transmission rate is selected.

In this embodiment, as shown in FIG. 8, the information processing device 10 selects the PIO mode 6 as the operation mode, when the CF card 50 is operable in the PIO mode 6 of the True IDE mode and in the Ultra DMA mode 0 but the CF card 50 is not operable in the Ultra DMA mode in which the cycle time is shorter than in the Ultra DMA mode 0. It is considered that the reason is because the PIO mode 6 is faster than the Ultra DMA mode 0 in the actual data transmission rate.

Next, as shown in FIG. 2, the information processing device 10 transmits data in the operation mode determined in Step S22 (Step S24). That is, when the user selects "the backup of the CF card", the information processing device 10 transmits and backs up data from the CF card 50 to the hard disk drive 26. Alternatively, when the user selects "the lookup of the CF card," file information stored in the CF card 50 is read in succession from the CF card 50, the file information as data is transmitted from the CF card 50 to the information processing device 10, and then the information processing device 10 displays a file list.

Subsequently, the information processing device 10 determines whether the data transmission is normally completed (Step S26). When it is determined that the data transmission is normally completed (Yes in Step S26), the process returns to Step S10 described above. Here, the fact that the data transmission is normally completed means that data backup from the CF card 50 to the hard disk drive 26 is completed when the user selects "the backup of the CF card." On the other hand, the fact that the data transmission is normally completed means that the file information stored in the CF card 50 is read in succession from the CF card 50, the file list is displayed, the user selects one or a plurality of files, and reading of the files is completed, when the user selects "the lookup of the CF card."

Figure 3:
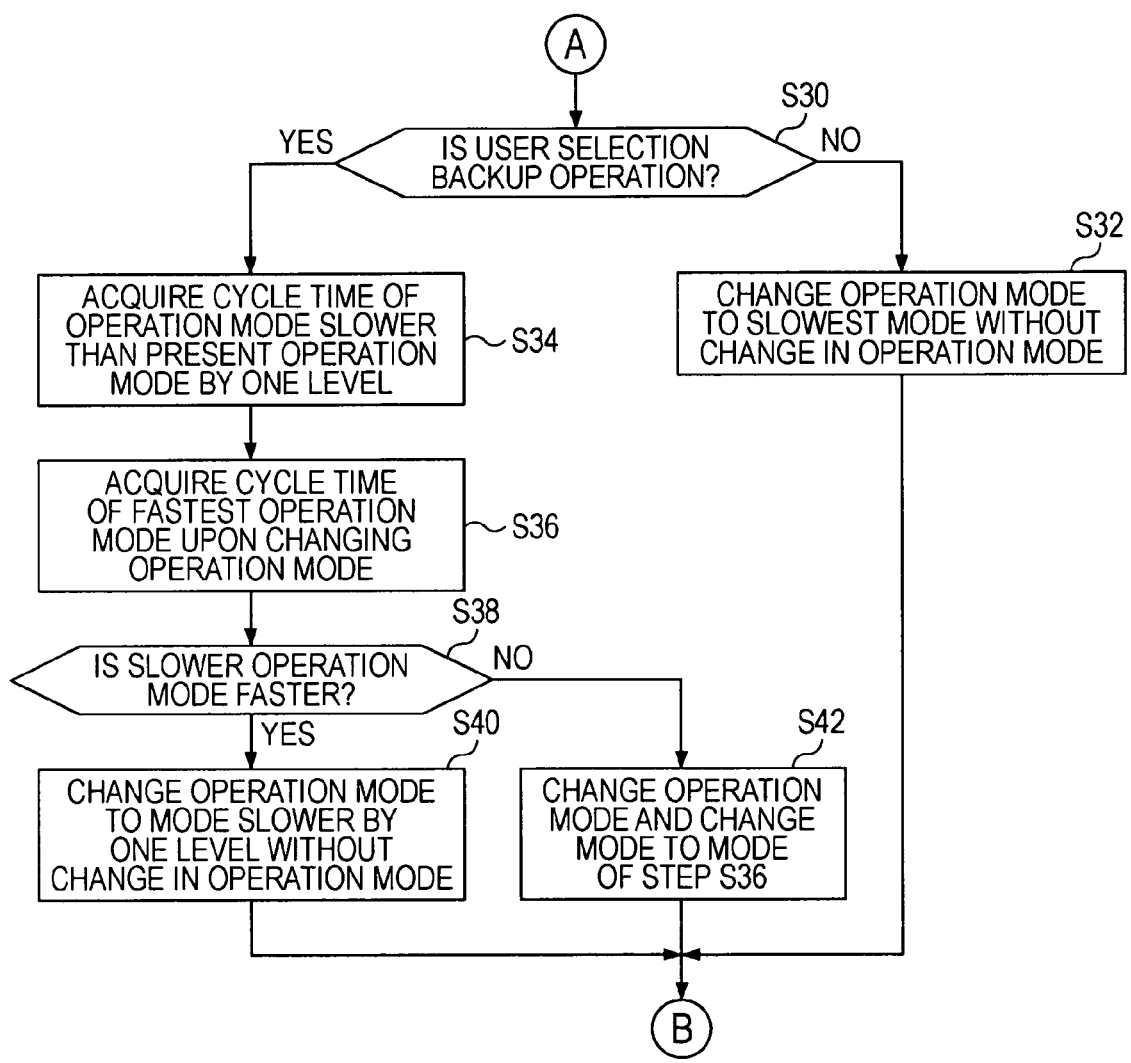
FIG. 3 is a flowchart illustrating the example of the card data transmitting process performed by the information processing device shown in FIG. 1.

Alternatively, when it is determined that the data transmission is not normally completed in Step S26 (No in Step S26), that is, when the data transmission and reception fail, the information processing device 10 determines whether the user selects "the backup of the CF card", as shown in FIG. 3 (Step S30).

When the user does not select "the backup of the CF card" (No in Step S30), that is, when the user selects "the lookup of the CF card", the operation mode determined in Step S22 is not switched but changed to the slowest mode of the operation mode (Step S32). That is, the memory mode and the True IDE mode are not switched, and the operation mode is changed to the slowest operation mode. That is because it takes time to switch the operation mode since the supply of the card power has to be stopped for a moment in the switch of the operation mode between the memory mode and the True IDE mode, as described above.

Subsequently, the information processing device 10 returns the process to Step S24 described above to again transmit the data. That is, without performing the switching between the memory mode and the True IDE mode, the information processing device 10 again tries to transmit the data in the operation mode having the longest cycle time among the operation modes in which the information processing device 10 is normally able to exchange data with the CF card 50.

The reason for the change to the operation mode having the longest cycle time is that there is a high possibility that the data are normally transmitted in the operation mode having the slowest communication rate. In addition, when the user selects "the lookup of the CF card", the data read from the CF card 50 are merely the file information. Therefore, there is no case where user standby time considerably increases even though a volume of data is small and the communication rate is slow to some extent.

For example, when the operation mode determined in Step S22 is the memory mode, the information processing device 10 again transmits the data in the operation mode in which the cycle time is 250 ns in the memory mode. For example, when the operation mode determined in Step S22 is the PIO mode 6 of the True IDE mode, the information processing device 10 again transmits the data in the PIO mode 0 of the same True IDE mode.

For example, when the operation mode determined in Step S22 is the Ultra DMA mode 3 of the True IDE mode, the information processing device 10 again transmits the data in the PIO mode 0 of the same True IDE mode. However, when the Ultra DMA mode which is shorter than the Ultra DMA mode 1 in the cycle time is selected in Step S22, the Ultra DMA mode 1 may be selected again as the operation mode for the data transmission. In this case, even when the data transmission fails in the Ultra DMA mode 1, the data may be again transmitted in the PIO mode 0.

Alternatively, when it is determined that the user selects "the backup of the CF card" in Step S30 (Yes in Step S30), the information processing device 10 acquires the cycle time of the operation mode slower than the present operation mode by one level while the present operation mode in which the switch between the memory mode and the True IDE mode is maintained (Step S34). That is, when the present operation mode is the memory mode, a cycle time of the operation mode slower by one level is acquired according to the table of FIG. 5. In addition, when the present operation mode is the PIO mode of the True IDE mode, the cycle time of the operation mode slower by one level is acquired according to the table of FIG. 6.

When the present operation mode is the Ultra DMA mode of the True IDE mode, the cycle time of the operation mode slower by one level is acquired according to the table of FIG. 7. In addition, in a case where the present operation mode is the Ultra DMA mode 1, the Ultra DMA mode 0 is selected when the present operation mode drops by one level. However, when the present operation mode is the Ultra DMA mode 0 in Step S38 described below, the PIO mode 6 is selected. Therefore, even when the operation mode determined in Step S22 is the Ultra DMA mode 1, for example, the data transmission rate is able to be decreased gradually from the Ultra DMA mode to the PIO mode.

Subsequently, the information processing device 10 specifies the cycle time of the operation mode having the shortest cycle time corresponding to the CF card 50, when the operation mode is changed between the memory mode and the True IDE mode (Step S36). That is, when the present operation mode is the memory mode, the cycle time of the operation mode having the fastest communication rate among the operation modes in which the normal data exchange with the CF card 50 is possible is acquired according to the tables of the True IDE modes shown in FIGS. 6 and 7. In addition, when the present operation mode is the PIO mode or the Ultra DMA mode of the True IDE mode, the cycle time of the operation mode having the fastest communication rate among the operation modes in which the normal data exchange with the CF card 50 is possible is acquired according to the table of the memory mode shown in FIG. 5.

When the data transmission fails after the change in the operation mode even in the process which has been performed, it is proven that the normal data exchange is not possible with the operation mode selected in the data transmission. Therefore, the operation mode of the communication rate in which the data transmission is not possible is excluded from selection candidates of the operation modes, and the cycle time of the operation mode slower than the operation mode in which the data transmission fails by one level is acquired.

Subsequently, the information processing device 10 determines whether a method of dropping the operation mode by one level while maintaining the present operation mode of the cycle time acquired in Step S34 is faster than a method of switching the operation mode in the data transmission rate (Step S38). Specifically, it is determined whether the data transmission rate is the fastest, when the mode selection table in FIG. 8 is retrieved on the basis of the cycle time (operation mode) acquired in Step S34 and the cycle time (operation mode) acquired in Step S36 and the data are transmitted in one operation mode among the memory mode, the PIO mode, and the Ultra DMA mode.

When it is determined that the method of dropping the operation mode by one level with the present operation mode maintained is faster in the data transmission rate (Yes in Step S38), the present operation mode is changed to the operation mode slower by one level without performing the switching between the memory mode and the True IDE mode (Step S40), the data transmission is again tried (Step S24), and then the processes subsequent to the process of Step S24 are repeatedly performed.

Alternatively, when it is determined that the method of dropping the operation mode by one level from the present operation mode is not faster in the data transmission rate (No in Step S38), that is, when the method of changing the operation mode is faster in the communication rate, the switch between the memory mode and the True IDE mode is performed and the present operation mode is switched to the operation mode of the cycle time acquired in Step S36 (Step S42). In addition, the data transmission is again tried using the switched operation mode (Step S24) and the processes subsequent to the process of Step s24 are repeatedly performed.

In this way, the information processing device 10 according to this embodiment checks whether the type of access selected by the user is the backup of the CF card 50 or the lookup of the CF card, when the data transmission fails. When the type of access is the backup of CF card 50, the communication rate of the operation mode dropped by one level from the present operation mode in which the memory mode and the True IDE mode are not switched is compared to the communication rate of the operation mode corresponding to a case where the operation mode is switched between the memory mode and the True IDE mode to try the data transmission in the operation mode in which the communication rate is faster. Accordingly, even when the data exchange with the CF card 50 fails in the operation mode in which the communication rate is the fastest, the information processing device 10 is capable of selecting the operation mode of the fastest data transmission rate at which the normal data exchange with the CF card 50 is possible. As a result, it is possible to make the user standby time as short as possible in the backup mode.

For example, a type of widely used CF card 50 having a large capacity is a 4GB CF card. When the data of the 4GB CF card 50 are backed up in the hard disk drive 26, about 10 minutes are necessary even in the fastest operation mode. Of course, time necessary for the backup is further increased in an operation mode that is slower than the fastest operation mode in the data transmission rate. Therefore, selecting an operation mode having a faster communication rate is better in that the entire user standby time necessary for the backup is shorter, even though it takes more time to select the operation mode.

On the other hand, when the user selects the lookup of the CF card, the method of switching the operation mode between the memory mode and the True IDE mode is not necessarily a good method, in that a volume of data to be transmitted is small, the power of the CF card 50 is interrupted once in the switch of the operation mode between the memory mode and the True IDE mode, and the user standby time is increased by the power interrupted time. Instead, the operation mode is changed to the operation mode in which there is the highest possibility of performing the normal data transmission without performing the switching between the memory mode and the True IDE mode, that is, the operation mode is changed to the operation mode of the slowest communication rate among the operation modes in which the normal data exchange is possible, in that it is considered that the user waits to watch the file list stored in the CF card 50 more quickly. Therefore, the information processing device 10 according to this embodiment is able to display the file list of the CF card 50 without wasted time taken to switch the operation mode between the memory mode and the True IDE mode.

Even when the data transmission in the Ultra DMA mode fails and the data are transmitted in the PIO mode, it is not necessary to interrupt the power of the CF card 50 since the Ultra DMA mode and the PIO mode are all the True IDE mode. Therefore, the switch from the Ultra DMA mode to the PIO mode is able to be performed for very short time.

Here, the operation mode and the communication rate in which the normal data exchange with the CF card 50 is possible refer to the operation mode and the communication rate in which the inserted CF card 50 is operable. For example, when the inserted CF card 50 is operable in each operation mode in which the cycle time is 80 ns, 100 ns, and 120 ns in the memory mode, but not operable in each operation mode in which the cycle time is 150 ns and 250 ns, which are longer than the above cycle time, the operation modes of which the cycle time is 150 ns and 250 ns are not contained in the selection candidates. That is, the operation modes in which the normal data exchange with the CF card 50 is possible are three operation modes of which the cycle time is 80 ns, 100 ns, and 120 ns.

The invention is not limited to the above-described embodiment, but may be modified in various forms. For example, in the above-described embodiment, when it is determined that the user does not select the backup of the CF card 50 in Step S30, the operation mode is dropped directly to the operation mode of the slowest communication rate among the operation modes in which the CF card 50 is operable. However, the operation mode may be dropped by each one level. However, in this case, the user standby time is slightly increased.

In the above-described embodiment, the CF (Compact Flash (registered trademark)) card is exemplified as a removable data record medium. However, the invention may be applied to other types of data record medium. That is, the invention may be applied to a data record medium which has a plurality of operation modes each having one or a plurality of communication rates and which needs to be turned on and off in the switch between the operation modes, as long as the information processing device 10 includes an access unit of the removable data record medium.

The invention is applicable to various operation modes in addition to the memory mode, the True IDE mode, and the I/O mode described above. That is, since various operation modes are prepared in accordance with data record media, the invention is applicable in accordance with the prepared operation modes.

"The backup of the CF card" shown in FIG. 4 is an example of the type of access in which data are all exchanged between the information processing device 10 and the CF card 50. Even when the backup of the CF card is a type of access other than this type of access, Steps S34 to S42 shown in FIG. 3 may be performed as long as the backup of the CF card is the type of access in which data are all exchanged.

"The lookup of the CF card" shown in FIG. 4 is an example of the type of access which is not the type of access in which data are all exchanged between the information processing device 10 and the CF card 50. Even when the lookup of the CF card is a type of access other than this type of access, Step S32 shown in FIG. 3 may be performed as long as the lookup of the CF card is the type of access which is not the type of access in which data are all exchanged.

In the above-described embodiment, the user selection is made in the type of access in which data are transmitted from the CF card 50 to the information processing device 10. However, the invention is applicable even to a case where the user selection is made in a type of access in which data are transmitted from the information processing device 10 to the CF card 50. In other words, options displayed in the CF card process selecting picture in FIG. 4 may be arbitrarily modified in accordance with a desire of the user or the specification of the information processing device 10.

In the above-described embodiment, it is determined which communication rate is faster between the communication rate in the memory mode and the communication rate in the True IDE mode on the basis of the mode selection table TB10 in FIG. 8 to select the operation mode in which the data are exchanged or the communication rate at which the data are exchanged. However, the operation mode in which data are exchanged may be selected on the basis of each of the acquired cycle time. That is, as described above, a shorter cycle time does not necessarily mean a faster communication rate between the memory mode and the True IDE mode. However, in general, when the cycle time is shorter, there is a high possibility that the communication rate is faster. Therefore, when the cycle time in the operation mode selected in the memory mode is shorter, the memory mode may be selected as the operation mode in which data are exchanged. In addition, when the cycle time in the operation mode selected in the PIO mode or the Ultra DMA mode of the True IDE mode is shorter, the True IDE mode may be selected as the operation mode in which data are exchanged. In this way, the capacity of the ROM 24 or the hard disk drive 26 storing the mode selection table TB10 is able to be decreased. Accordingly, it is possible to arbitrarily change a method of determining which communication rate is the fastest.

As for the card data transmitting process described above, a program for executing the card data transmitting process may be recorded in a record medium such as a flexible disk, a CD-ROM (Compact Disk-Read Only Memory), a ROM, or a memory card to be distributed in the form of the record medium. In this case, the above-described embodiment is able to be realized by allowing the information processing device 10 to read and execute the program recorded in the record medium.

In some cases, the information processing device 10 has other programs such as an operating system or other application programs. In this case, in order to employ the other programs of the information processing device 10, a program containing a command for calling a program capable of realizing the same process as that of the above-described embodiment among the programs of the information processing device 10 may be recorded in the record medium.

This program may be distributed not in the form of the record medium but in the form of carrier waves through a network. The program distributed in the form of the carrier waves through the network is input to the information processing device 10 to realize the above-described embodiment by executing the program.

When the program is recorded in the record medium or distributed in the form of carrier waves through the network, the program is encoded or compressed in some cases. In this case, the information processing device 10 reading the program from the record medium or the carrier wave needs to decode or decompress the program to execute the program.

In the above-described embodiment, the card data transmitting process is realized by software, but may be realized by hardware such as an ASIC (Application Specific IC). In addition, the card data transmitting process may be performed in cooperation with hardware and software.

What is claimed is:

1. An information processing device comprising:
   a data record medium access unit into which a data record medium, which has a first operation mode having one or a plurality of communication rates and a second operation mode having one or a plurality of communication rates as operation modes and has a first sub-operation mode having one or a plurality of communication rates and a second sub-operation mode having one or a plurality of communication rates as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode;
   a selection unit which allows a user to select a type of access to the data record medium inserted into the data record medium access unit;
   a first access unit which gains the type of access selected through the selection unit at a communication rate in an operation mode, wherein the communication rate is set to a fastest of rates of the first operation mode, the first sub-operation mode of the second operation mode, and the second sub-operation mode of the second operation mode;

a second access unit which gains the type of access to the data record medium which is selected through the selection unit at the communication rate, when the access of the first access unit fails, wherein the communication rate is set to a greater of communication rates at which normal data exchange is possible in the first operation mode and the second operation mode in a case where the access selected by the user through the selection unit is a type of access in which data are all exchanged; and a third access unit which gains the type of access to the data record medium which is selected through the selection unit, when the access of the first access unit fails, by reducing the communication rate without performing switching between the first operation mode and the second operation mode in a case where the type of access selected by the selection unit is not a type of access in which data are all exchanged.

2. The information processing device according to claim 1, wherein the communication rate is reduced to a slowest of communication rates at which the normal data exchange with the data record medium is possible without performing the switching between the first operation mode and the second operation mode, when the third access unit reduces the communication rate.

3. The information processing device according to claim 1, wherein when access to the data record medium fails, the second access unit determines that the normal data exchange with the data record medium is not possible with a selected communication rate and excludes the selected communication rate from candidates of the communication rate, and then the second access unit selects a fastest communication rate among communication rates in which the normal data exchange is possible in the first operation mode, the first sub-operation mode of the second operation mode, and the second sub-operation mode of the second operation mode to again gain the type of access to the data record medium which is selected through the selection unit.

4. The information processing device according to claim 1, wherein the type of access selected through the selection unit includes at least backup of data recorded in the data record medium as a type of access in which data are all exchanged and lookup of the data recorded in the data record medium as a type of access which is not a type of access in which data are all exchanged.

5. The information processing device according to claim 1, wherein the first access unit gains access to the data record medium to acquire a communication rate at which the access to the data record medium is possible in the first operation mode, a communication rate at which the access to the data record medium is possible in the first sub-operation mode of the second operation mode, and a communication rate at which the access to the data record medium is possible in the second sub-operation mode of the second operation mode and selects an operation mode having a fastest communication rate among the acquired communication rates.

6. The information processing device according to claim 1, wherein the first operation mode is a memory mode, the second operation mode is a True IDE mode, the first sub-operation mode is a PIO mode, and the second sub-operation mode is an Ultra DMA mode.

7. A method of controlling an information processing device including a data record medium access unit into which a data record medium, which has a first operation mode having one or a plurality of communication rates and a second operation mode having one or a plurality of communication rates as operation modes and has a first sub-operation mode having one or a plurality of communication rates and a second sub-operation mode having one or a plurality of communication rates as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode, the method comprising the steps of:

allowing a user to select a type of access to the data record medium inserted into the data record medium access unit;

gaining the type of access to the data record medium which is selected by the user at a communication rate in an operation mode, wherein the communication rate is set to a fastest of rates of the first operation mode, the first sub-operation mode of the second operation mode, and the second sub-operation mode of the second operation mode;

gaining the type of access to the data record medium which is selected by the user, when the access to the data record medium fails, wherein the communication rate is set to a greater of communication rates at which normal data exchange is possible in the first operation mode and the second operation mode in a case where the access selected by the user is a type of access in which data are all exchanged; and gaining the type of access to the data record medium which is selected by the user, when the access to the data record medium fails, by reducing the communication rate without performing switching between the first operation mode and the second operation mode in a case where the type of access selected by the user is not a type of access in which data are all exchanged.

8. An information processing device comprising:

a data record medium access unit into which a data record medium, which has a first operation mode having one or a plurality of communication rates and a second operation mode having one or a plurality of communication rates as operation modes and has a first sub-operation mode having one or a plurality of communication rates and a second sub-operation mode having one or a plurality of communication rates as sub-operation modes of the second operation mode, is inserted and which gains access to the inserted data record medium, wherein it is necessary to stop power supply to the data record medium when the access to the data record medium is switched between the first operation mode and the second operation mode, but it is not necessary to stop the power supply to the data record medium when the access to the data record medium is switched between the first sub-operation mode and the second sub-operation mode;

a selection unit which allows a user to select a type of access to the data record medium inserted into the data record medium access unit, wherein the information processing device is able to select an operation mode having a fastest data transmission rate among operation modes in which a newly detected data record medium is operable on the basis of a mode selection table.

* * * * *